United States Patent
Sondur

(10) Patent No.: US 8,165,233 B2
(45) Date of Patent: *Apr. 24, 2012

(54) MULTI-ELEMENT ANTENNA BEAMFORMING IN A WIRELESS ACCESS NETWORK

(75) Inventor: Lakshmipathi Sondur, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 734 days.

This patent is subject to a terminal disclaimer.

(21) Appl. No.: 12/245,050

(22) Filed: Oct. 3, 2008

(65) Prior Publication Data

US 2009/0034640 A1    Feb. 5, 2009

Related U.S. Application Data

(63) Continuation of application No. 10/654,037, filed on Sep. 3, 2003, now Pat. No. 7,453,946.

(51) Int. Cl.
    *H04L 27/28* (2006.01)
(52) U.S. Cl. ........................................... 375/260
(58) Field of Classification Search ............. 375/259, 375/260, 267
    See application file for complete search history.

(56) References Cited

U.S. PATENT DOCUMENTS

| | | | |
|---|---|---|---|
| 4,965,732 A | 10/1990 | Roy, III et al. | |
| 5,844,951 A | 12/1998 | Proakis et al. | |
| 6,108,565 A | 8/2000 | Scherzer | |
| 6,347,234 B1 * | 2/2002 | Scherzer | 455/562.1 |
| 6,870,808 B1 * | 3/2005 | Liu et al. | 370/203 |
| 7,453,946 B2 * | 11/2008 | Sondur | 375/267 |
| 2002/0048286 A1 | 4/2002 | Brunel | |
| 2002/0105928 A1 | 8/2002 | Kapoor et al. | |
| 2002/0122472 A1 | 9/2002 | Lay | |
| 2002/0159537 A1 | 10/2002 | Crilly | |
| 2005/0047322 A1 | 3/2005 | Sondur | |

FOREIGN PATENT DOCUMENTS

| | | |
|---|---|---|
| EP | 1276251 A1 | 1/2003 |
| EP | 1335504 A2 | 8/2003 |
| WO | WO-02093860 A1 | 11/2002 |
| WO | WO-2005024995 A2 | 3/2005 |
| WO | WO-2005024995 A3 | 3/2005 |

OTHER PUBLICATIONS

"Chinese Application Serial No. 200480024882.X , Office Action mailed Jul. 2, 2010", with English translation, 7 pgs.
"Chinese Application Serial No. 200480024882.X, Office Action mailed Jan. 13, 2011", with English translation, 7 pgs.

(Continued)

*Primary Examiner* — Kevin M Burd
(74) *Attorney, Agent, or Firm* — Schwegman, Lundberg & Woessner, P.A.; Gregory J. Gorrie

(57) ABSTRACT

A communication node of a wireless local area network utilizes a multi-element array antenna to estimate an angle-of-arrival for one or more signal sources which may communicate on symbol-modulated orthogonal subcarriers. Channel coefficients may be estimated from the angle-of-arrival for the one or more signal sources to increase channel capacity, improve channel equalization and reduce the effects of multipath fading. Beamforming based on the angle-of-arrival may also be performed for directional reception and/or transmission of communications with the one or more signal sources.

6 Claims, 4 Drawing Sheets

OTHER PUBLICATIONS

"European Application Serial No. 04786582.9, Office Action mailed Nov. 21, 2007", 9 pgs.

Chinese Application Serial No. 200480024882, Office Action mailed Jan. 16, 2009, 21 pgs.

"U.S. Appl. No. 10/654,037 Non-Final Office Action mailed Aug. 15, 2007", 10 pgs.

"U.S. Appl. No. 10/654,037 Response filed Apr. 16, 2008 to Non-Final Office Action mailed Jan. 30, 2008", 14 pgs.

"U.S. Appl. No. 10/654,037 Response filed Nov. 13, 2007 in response to Non-Final Office Action mailed Aug. 15, 2007", 13 pgs.

"U.S. Appl. No. 10/654,037, Notice of Allowance mailed Jul. 1, 2008", 7 pgs.

"U.S. Appl. No. 10/654,037 Non-Final Office Action mailed Jan. 30, 2008.", 8 pgs.

"International Search Report for PCT Application No. PCT/US2004/027741", (Mar. 10, 2005), 4 pgs.

Chiani, M., et al., "Spatial and Temporal Equalization for Broadband Wireless Indoor Networks at Millimeter Waves", *IEEE Jouranl on Selected Areas in Communications*, 17(10), (1999), 1725-1734.

Edman, F., "Implementation Aspects of Algorithms for Adaptive Antennas", *Master of Science Thesis in Electrical Engineering, Department of Applied Electronics*, (1999), 1-4, 23-34.

McCarthy, F., "Multiple Signal Direction-Finding and Interference Reduction Techniques", *WESCON '93. Conference Record.*, (1993), 354-361.

Hernandez, M. A., et al., "Subspace Based Estimation of Parameters and Linear Space-Time Mulituser Detection for WCDMA Systems", *IEEE 6th International Symposium on Spread Spectrum Techniques and Applications*, vol. 1, (2000), 249-253.

Krim, H., et al., "Two Decades of Array Signal Processing Research—The Parametric Approach", *IEEE Signal Processing Magazine*, (1996), 67-94.

Paulraj, A. J., et al., "Space-Time Processing for Wireless Communications", *IEEE Signal Processing Magazine*, (1997), 49-83.

Roy, R., et al., "ESPRIT—A Subspace Rotation Approach to Estimation of Parameters of Cisoids in Noise", *IEEE Transactions on Acoustics, Speech, and Signal Processing*, vol. ASSP-34, No. 5, (1986), 1340-1342.

Schmidt, R. O., "Multiple Emitter Location and Signal Parameter Estimation", *IEEE Transactions on Antennas and Propagation*, vol. AP-34, No. 3 (1986), 276-280.

Vanderveen, M. C., et al., "Joint Angle and Delay Estimation (JADE) for Signals in Multipath Environments", *Conference Record of the Thirtieth Asilomar Conference on Signals, Systems & Computers*, held from Nov. 3-6, 1995 in Pacific Grove, CA, (1996), 1250-1254.

\* cited by examiner

MULTI-ELEMENT ANTENNA BEAMFORMING IN A WIRELESS ACCESS NETWORK

RELATED APPLICATIONS

This application is a continuation of U.S. patent application Ser. No. 10/654,037, filed Sep. 3, 2003, now issued as U.S. Pat. No. 7,453,946, which is incorporated herein by reference in its entirety.

TECHNICAL FIELD

Embodiments of the present invention pertain to wireless communications, and some embodiments pertain to systems using symbol-modulated orthogonal subcarrier communications.

BACKGROUND

Orthogonal frequency division multiplexing is an example of a multi-carrier transmission technique that uses symbol-modulated orthogonal subcarriers to transmit information within an available spectrum. When the subcarriers are orthogonal to one another, they may be spaced much more closely together within the available spectrum than, for example, the individual channels in a conventional frequency division multiplexing (FDM) system. To achieve orthogonality, a subcarrier may have a null at the center frequency of the other subcarriers. Orthogonality of the subcarriers may help reduce inter-subcarrier interference within the system. Before transmission, the subcarriers may be modulated with a low-rate data stream. The transmitted symbol rate of the symbols may be low, and thus the transmitted signal may be highly tolerant to multipath delay spread within the channel. For this reason, many modern digital communication systems are using symbol-modulated orthogonal subcarriers as a modulation scheme to help signals survive in environments having multipath reflections and/or strong interference.

Communication systems that use symbol-modulated orthogonal subcarrier communications may have reduced channel capacity due to multipath fading and other channel conditions. Thus, there are general needs for apparatus and methods that increase channel capacity, improve channel equalization and/or reduce the effects of multipath fading, especially in systems using symbol-modulated orthogonal subcarrier communications.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate some specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
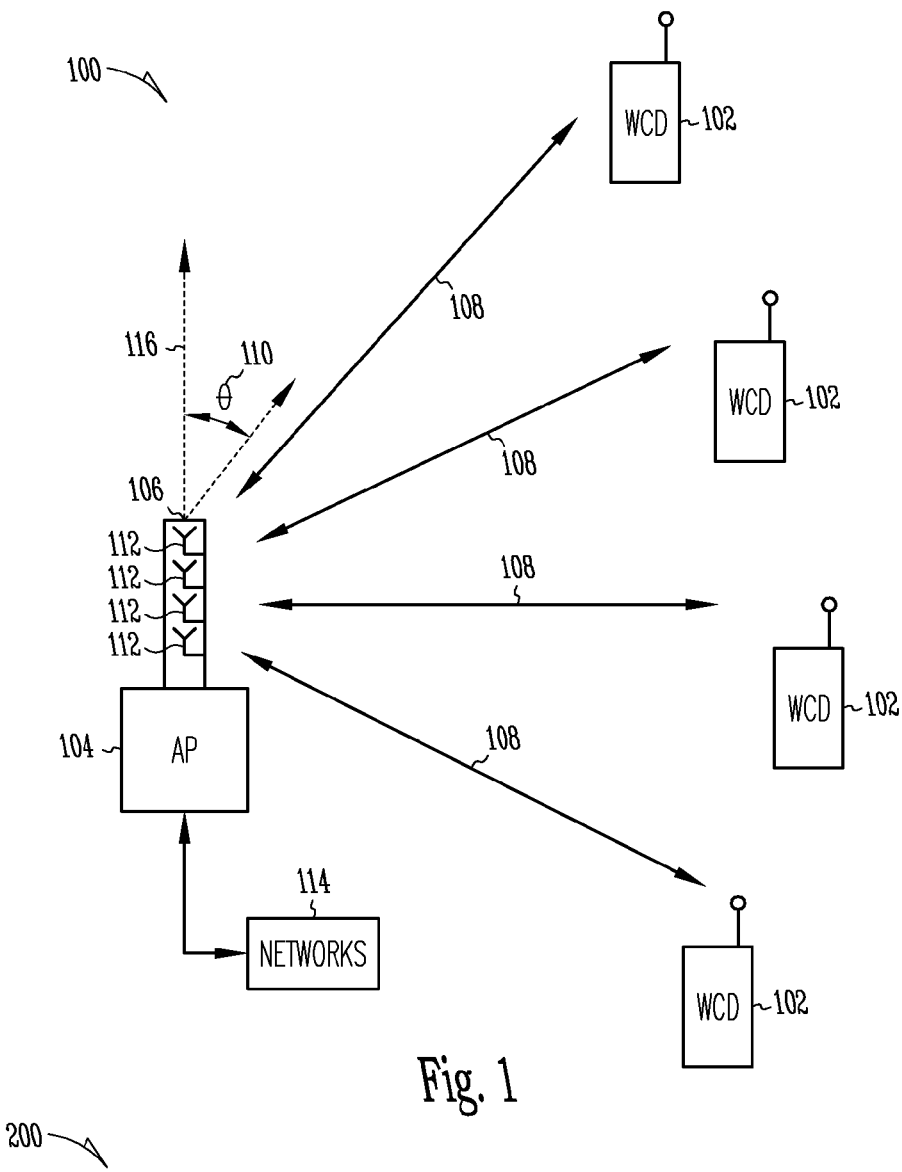
FIG. 1 illustrates a wireless communication environment in which some embodiments of the present invention may be practiced.

FIG. 1 illustrates a wireless communication environment in which some embodiments of the present invention may be practiced. Communication environment 100 includes one or more wireless communication devices (WCD) 102 which may communicate with access point (AP) 104 over communication links 108, which may be bi-directional links. WCDs 102 may include, for example, personal digital assistants (PDAs), laptop and portable commuters with wireless communication capability, web tablets, wireless telephones, wireless headsets, pagers, instant messaging devices, MP3 players, digital cameras, and other devices that may receive and/or transmit information wirelessly. WCDs 102 may communicate with AP 104 using a multi-carrier transmission technique, such as an orthogonal frequency division multiplexing (OFDM) technique that uses orthogonal subcarriers to transmit information within an assigned spectrum. WCDs 102 and AP 104 may also implement one or more communication standards, such as one of the IEEE 802.11a, b or g standards, the Digital Video Broadcasting Terrestrial (DVB-T) broadcasting standard, or the High performance radio Local Area Network (HiperLAN) standard. Other local area network (LAN) and wireless area network (WAN) communication techniques may also be suitable for communication over links 108.

In addition to facilitating communications between WCDs 102, in some embodiments, AP 104 may be coupled with one or more networks 114, such as an intranet or the Internet, allowing WCDs 102 to access such networks. For convenience, the term "downstream" is used herein to designate communications in the direction from AP 104 to WCDs 102 while the term "upstream" is used herein to designate communications in the direction from WCDs 102 to AP 104, however, the terms downstream and upstream may be interchanged. WCDs 102 may support duplex communications utilizing different spectrum for upstream and downstream communications, although this is not a requirement. In some embodiments, upstream and downstream communications may share the same spectrum for communicating in both the upstream and downstream directions. Although FIG. 1 illustrates point-to-multipoint communications, embodiments of the present invention are suitable to both point-to-multipoint and point-to-point communications.

In some embodiments, a communication node (e.g., access point 104) of a wireless local area network (WLAN) may utilize multi-element array antenna 106 to estimate angle-of-arrival 110 (e.g., theta (θ)) for communication signals received over links 108 from one or more signal sources (e.g., WCDs 102). Angle 110 may be measured relative to end-fire direction 116 of the antenna 106, although the scope of the invention is not limited in this respect. The signal sources may be wireless communication devices which communicate on symbol-modulated orthogonal subcarriers. Channel coefficients may be estimated from the angle-of-arrival for the one or more signal sources to increase channel capacity, improve channel equalization and/or reduce the effects of multipath fading. In some embodiments, the channel coefficients may be generated from one symbol modulated on a plurality of subcarriers received by different elements of antenna 106. In some embodiments, AP 104 may provide communications within a range of up to 500 feet, and even greater, for wireless communication devices, although the scope of the invention is not limited in this respect.

In some embodiments, beamforming coefficients may also be generated from the angle-of-arrival for improved reception and/or transmission of communication signals with the one or more signal sources using multi-element array antenna 106. The beamforming coefficients may be used to direct the reception and/or transmission of signals in a direction of the particular signal source. The angle-of-arrival may be estimated by sampling the response from the antenna elements of the array for at least one symbol at the subcarrier frequencies, although the scope of the invention is not limited in this respect. The sampled symbol may be a training symbol having a known value. The sampling may be performed on the same symbol at all subcarrier frequencies after demodulation by a fast Fourier transform (FFT) although the scope of the invention is not limited in this respect. With beamforming, frequency reuse may be realized using space-division multiple access techniques.

Multi-element array antenna 106 may be a phased-array antenna comprising at least two directional or omnidirectional antenna elements 112. Elements 112 may comprise dipole antennas, monopole antennas, loop antennas, microstrip antennas or other type of antenna suitable for reception and/or transmission of RF signals which may be processed by AP 104. In some embodiments, a beamformer may be used to control phasing between elements 112 to provide directional communications with WCDs 102. In some embodiments, the phasing may be controlled at baseband, although the scope of the invention is not limited in this respect.

Figure 2:
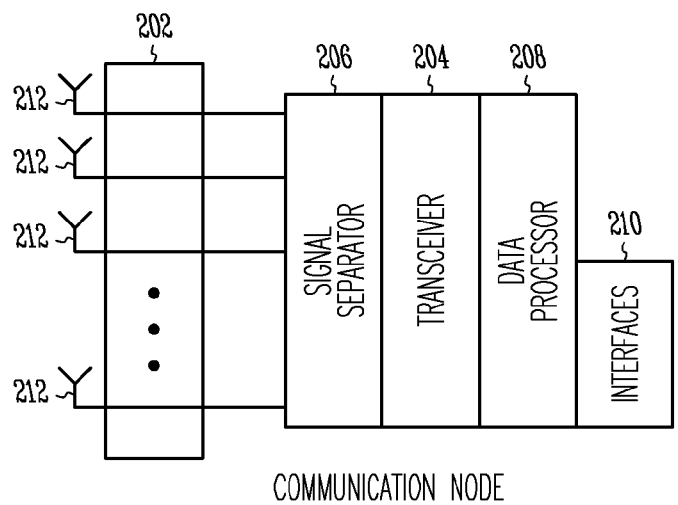
FIG. 2 is a block diagram of a communication node in accordance with some embodiments of the present invention.

FIG. 2 is a block diagram of a communication node in accordance with some embodiments of the present invention. Communication node 200 may be suitable for use as AP 104 (FIG. 1), although other communication nodes may also be suitable. In some embodiments, communication node 200 may also be suitable for use as one or more of WCDs 102 (FIG. 1), although the scope of the invention is not limited in this respect.

Communication node 200 receives and/or transmits radio frequency (RF) communications with multi-element array antenna 202. RF signals received from antenna 202 may be converted to baseband signals and eventually to data signals comprising a bit stream by transceiver 204. Transceiver 204 may also convert data signals comprising a bit stream to baseband signals and RF signals for transmission by antenna 202. Communication node 200 may also include signal separator 206 to separate received and transmitted communication signals. Communication node 200 may also include data processing portion 208 to process data signals received through transceiver 204 and generate data signals for transmission by transceiver 204. Antenna 202 may comprise a plurality of antenna elements 212, which may correspond to antenna elements 112 (FIG. 1). Although signal separator 206 is illustrated as a separate element of node 200, the present invention is not limited in this respect. In some embodiments, signal separator 206 may be part of antenna 202, while in other embodiments, antenna 202 may comprise one set of antenna elements for transmission of signals, and another set of antenna elements for reception of signals eliminating the need for signal separator 206.

In some embodiments, communication node 200 may include interfaces 210 to wireline devices and wireline networks, such as to a personal computer, a server, or the Internet, for example. In these embodiments, communication node 200 may facilitate communications between WCDs 102 (FIG. 1) and these wireline devices and/or networks.

Figure 3:
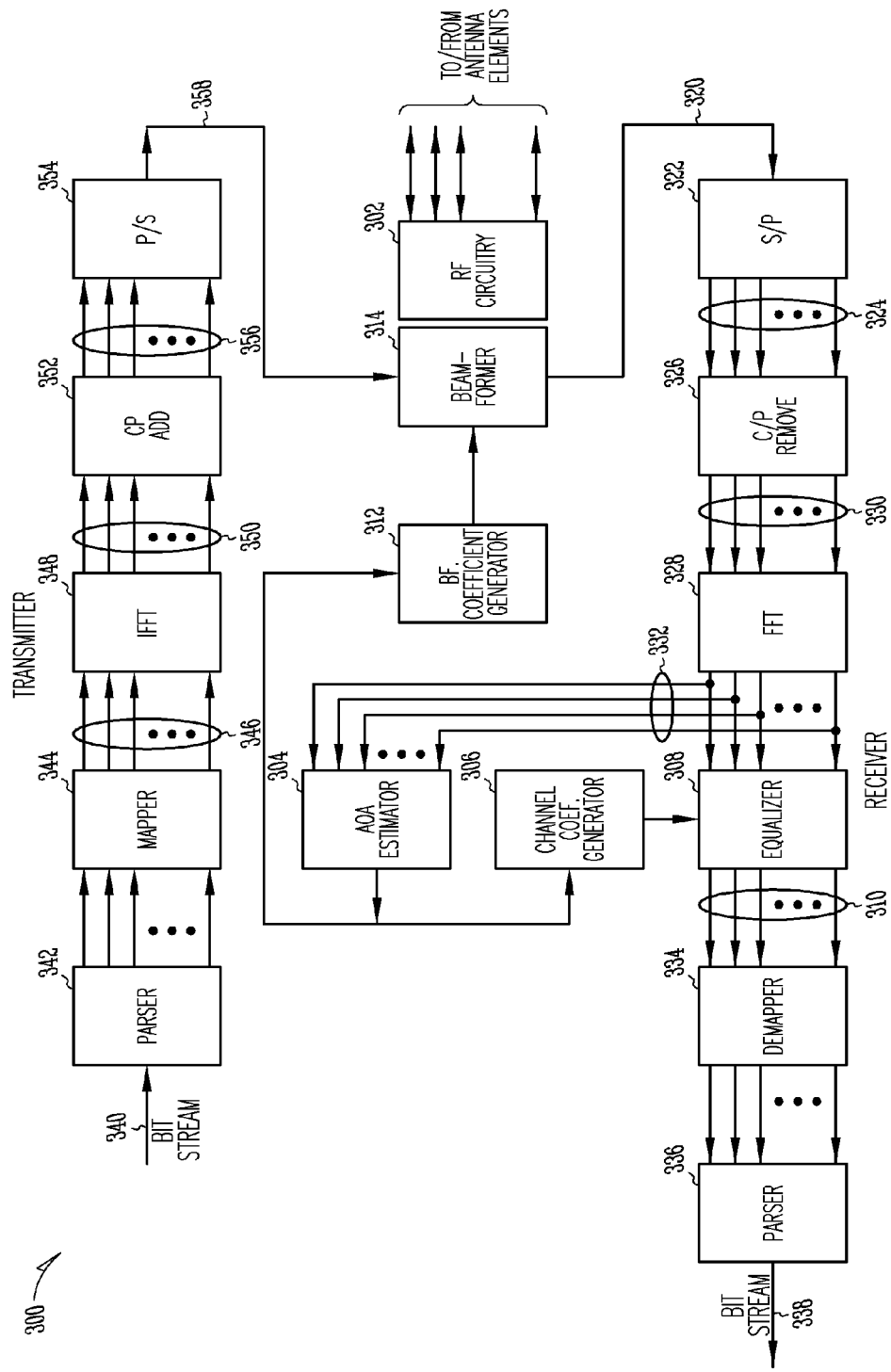
FIG. 3 illustrates a block diagram of a transceiver in accordance with some embodiments of the present invention.

FIG. 3 illustrates a block diagram of a transceiver in accordance with some embodiments of the present invention. Transceiver 300 may be suitable for use as transceiver 204 (FIG. 2) although other transceiver configurations may also be suitable. Transceiver 300 may include RF circuitry 302 to receive a signal from a signal source through a multi-element antenna having a plurality of antenna elements. The signal may comprise a plurality of subcarriers modulated with at least one symbol. Transceiver 300 may also include angle-of-arrival (AOA) estimator 304 to estimate an angle-of-arrival for a signal source from a subcarrier level of the symbol received by at least two of the antenna elements. Transceiver 300 may also include channel coefficient generator 306 to generate channel coefficients for communications received from the signal source based on the angle-of-arrival. The channel coefficients may compensate for at least some of the channel effects between a signal source and the access point. Transceiver 300 may also include channel equalizer 308 which may be responsive to the channel coefficients to provide equalized frequency-domain symbol-modulated subcarriers 310 resulting in improved reception.

In some embodiments, transceiver 300 may further include beamformer coefficient generator 312 to generate beamforming coefficients for elements of the multi-element antenna based on the angle-of-arrival. The beamforming coefficients may be used to help direct the reception and/or transmission of signals in a direction of a particular signal source. In these embodiments, transceiver 300 may further include beamformer 314. Beamformer 314 may change the directionality of the antenna based on the beamforming coefficients, and in some embodiments, beamformer 314 may change phasing of received and/or transmitted signals. In some embodiments, beamforming may be done prior to conversion to corresponding RF signals by RF circuitry 302 and transmission of the signals by the elements of the multi-element antenna. In some embodiments, beamformer 314 may change the directionality of the antenna by changing the phasing of baseband-level signals that comprise a plurality of symbol-modulated subcarriers for use in generating and/or receiving an orthogonal-frequency division multiplexed signal by RF circuitry 302 for transmission and/or reception by a multi-element antenna. With beamforming, frequency reuse may be realized using space-division multiple access techniques.

In some embodiments, angle-of-arrival estimator 304 may include one or more processors and memory to generate an initial matrix (e.g., X) comprising demodulated pilot subcarriers for a symbol provided by FFT 328 corresponding to each of the antenna elements. The processor and memory may also generate a response matrix (e.g., A) substantially from the equation $X=AD+N$. In the equation, 'D' may represent a diagonal matrix having elements corresponding to the pilot subcarriers of the symbol, and 'N' may represent an uncorrelated noise matrix. The processor and memory may use a search function to identify a peak corresponding to the angle-of-arrival. The search function may be based on a decomposition of the response matrix. This is described in more detail below.

Figure 4:
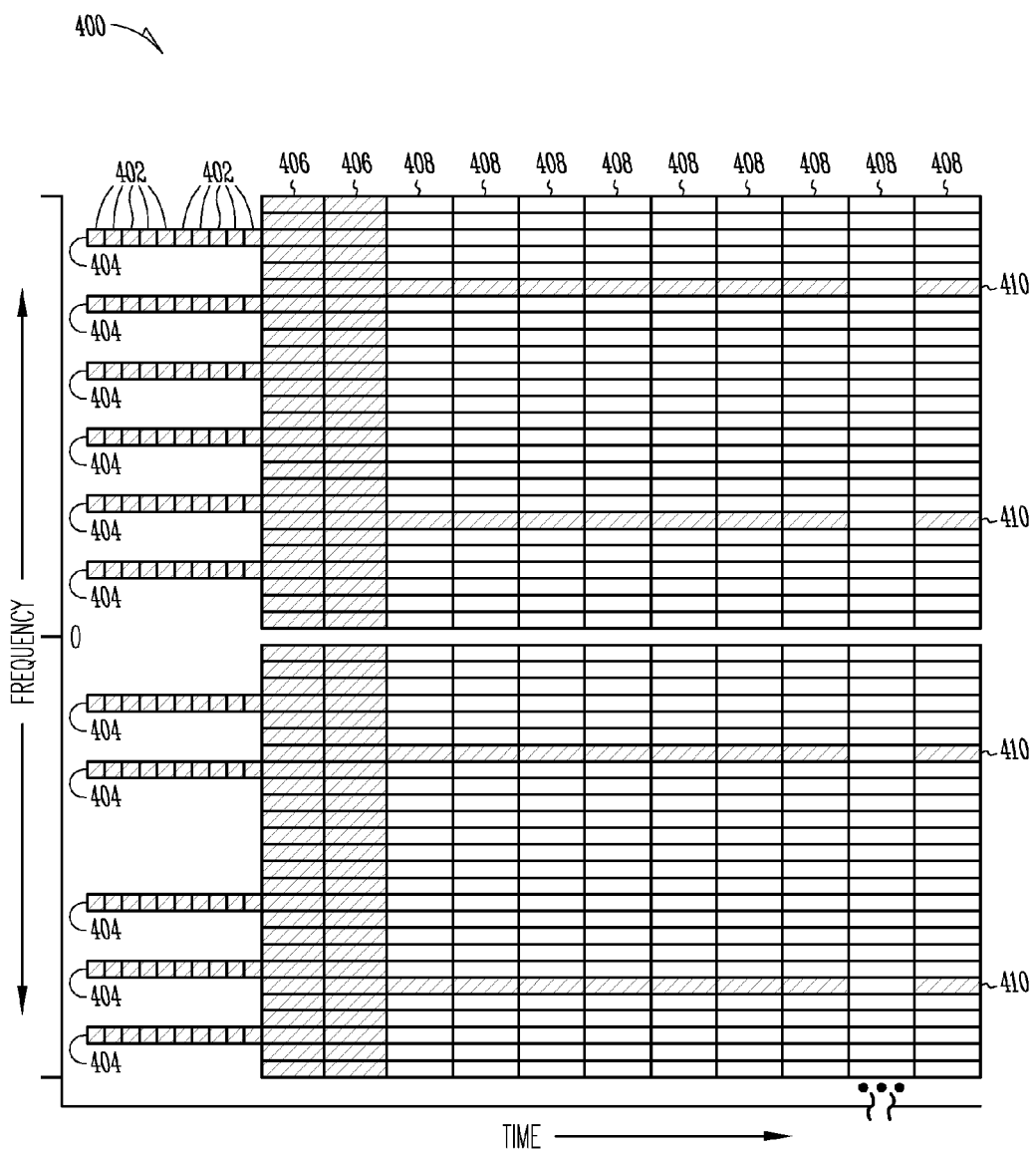
FIG. 4 illustrates a time-frequency structure of an orthogonal frequency division multiplexed packet suitable for use with some embodiments of the present invention.

FIG. 4 illustrates a time-frequency structure of an orthogonal frequency division multiplexed packet suitable for use with some embodiments of the present invention. Time-frequency structure 400 is an example of a packet in accordance with the IEEE 802.11(a) standard; however, other time-frequency structures for packets may be equally suitable for use with some embodiments of the present invention. As illustrated in structure 400, symbols having known training values are crosshatched/shaded. Structure 400 illustrates a packet starting with ten short training symbols 402 modulated on twelve subcarriers 404. These symbols may contain known pilot subcarriers. Short training symbols 402 are followed by two long training symbols 406 which are followed by data symbols 408. Data symbols 408 may include four pilot subcarriers 410.

In some embodiments, angle-of-arrival estimator 304 (FIG. 3) may estimate the angle-of-arrival based the antenna response for subcarriers 404 for one of training symbols 402 or based on one of training symbols 406, although the scope of the invention is not limited in this respect. A training symbol may have known training values. In some embodiments, channel equalizer 308 (FIG. 3) may provide equalized frequency-domain symbol-modulated subcarriers for subsequent data symbols (e.g., symbols 408) of a data packet received from the signal source.

Referring back to FIG. 3, in some embodiments, RF receive circuitry 302 receives signals through a multi-element antenna, and generates serial symbol stream 320 representing symbols. In some embodiments, a packet may include short training symbols 402 (FIG. 4) and long training symbols 406 (FIG. 4) followed by data symbols 408 (FIG. 4). In some embodiments, the received signal may have a carrier frequency ranging between 5 and 6 GHz, although embodiments of the present invention are equally suitable to carrier frequencies, for example, ranging between 2 and 20 GHz, and even greater. In some embodiments, a symbol-modulated signal may include up to a hundred or more subcarriers. The short training symbols may be transmitted on a portion of the subcarriers, and data symbols may contain one or more known pilot subcarriers although this is not a requirement. In some embodiments, the long training symbols may have a duration of approximately 4 microseconds and the short training symbols may have a duration of approximately one microsecond. In some embodiments, the signals may be infrared (IR) signals.

The receiver portion of transceiver 300 may include serial to parallel (S/P) converter 322 to convert a symbol of serial symbol stream 320 into parallel groups of time-domain samples 324. Cyclic-redundancy prefix (C/P) element 326 removes a cyclic-redundancy prefix from each symbol. Fast Fourier Transform (FFT) element 328 performs an FFT on parallel groups of time-domain samples 330 to generate frequency-domain symbol-modulated subcarriers 332 for use by equalizer 308 and angle-of-arrival estimator 304.

Angle-of-arrival estimator 304 may generate an angle-of-arrival estimate for a signal source which may be used by channel coefficient generator 306 for generating channel coefficients for use by equalizer 308 for improved demodulation of the subcarriers. In some embodiments, a channel estimator (not illustrated) may be used, in addition to generator 306, to generate channel estimates for use by equalizer 308.

Equalizer 308 may perform a channel equalization on frequency-domain symbol-modulated subcarriers 332 provided by FFT element 328. Equalizer 308 may generate equalized frequency-domain symbol-modulated subcarriers 310 using the channel coefficients provided by channel coefficient generator 306. For example, equalization in the frequency domain may be performed by division of the frequency domain subcarriers 332 with complex values that represent the channel estimation. Accordingly, the magnitudes of equalized frequency-domain symbol-modulated subcarriers 332 may be normalized and the phases of equalized frequency-domain symbol-modulated subcarriers 310 may be aligned to a zero origin to allow for further processing by demapper 334.

Equalized frequency-domain symbol-modulated subcarriers 310 may be demapped by demapper 334 to produce a plurality of parallel symbols. Demapper 334 may demap the parallel symbols in accordance with a particular modulation order in which the transmitter modulated the subcarriers. Modulation orders, for example, may include binary phase shift keying (BPSK), which communicates one bit per symbol, quadrature phase shift keying (QPSK), which communicates two bits per symbol, 8-PSK, which communicates three bits per symbol, 16-quadrature amplitude modulation (16-QAM), which communicates four bits per symbol, 32-QAM, which communicates five bits per symbol, and 64-QAM, which communicates six bits per symbol. Modulation orders may also include differentially-coded star QAM (DSQAM). Modulation orders with lower and even higher communication rates may also be used. The parallel symbols from demapper 334 may be converted from a parallel form to a serial stream by parser 336, which may perform a de-interleaving operation on the serial stream. Parser 336 generates decoded serial bit stream 338 for use by data processing elements (not illustrated).

The transmitter portion of transceiver 300 may include parser 342 to encode serial bit-stream 340 to generate parallel symbols. Mapper 344 maps the parallel symbols to frequency-domain symbol-modulated subcarriers 346. IFFT element 348 performs an inverse fast Fourier transform (IFFT) on frequency-domain symbol-modulated subcarriers 346 to generate parallel groups of time-domain samples 350. CP circuit 352 adds a cyclic-redundancy prefix to each symbol, and parallel-to-serial (P/S) circuit 354 converts the parallel groups of time-domain samples 356 to serial symbol stream 358 for RF circuitry 302. In accordance with embodiments, the length of the cyclic-redundancy prefix is greater than the length of intersymbol interference.

Although communication node 200 (FIG. 2) and transceiver 300 are illustrated as having several separate functional circuit elements, one or more of the functional elements may be combined and may be implemented by combinations of software-configured elements, such as processing elements including digital signal processors (DSPs), and/or other hardware elements and software. For example, circuit elements may comprise one or more processing elements such as microprocessors, DSPs, application specific integrated circuits (ASICs), and combinations of various hardware and logic circuitry for performing at least the functions described herein.

Figure 5:
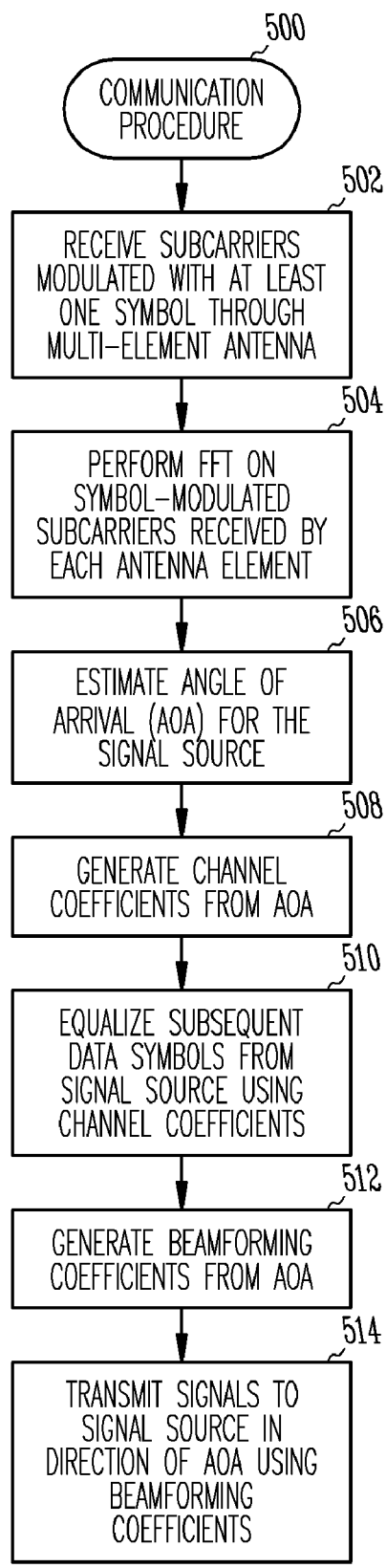
FIG. 5 is a flow chart of a communication procedure in accordance with some embodiments of the present invention.

FIG. 5 is a flow chart of a communication procedure in accordance with some embodiments of the present invention. Communication procedure 500 may be performed by a communication node, such as AP 104 (FIG. 1) although other communication nodes may also be suitable for performing procedure 500. In some embodiments, communication procedure 500 may be performed by communication devices, such as WCDs 102 (FIG. 1). Although the individual operations of procedure 500 are illustrated and described as separate operations, one or more of the individual operations may be performed concurrently and nothing requires that the operations be performed in the order illustrated.

In operation 502, a signal comprising at least one symbol of a data packet comprising symbol-modulated subcarriers is received through a multi-element antenna from a signal source. In operation 504, an FFT may be performed on parallel groups of time-domain samples that represent the symbol as received by the elements of the multi-element antenna. The FFT may generate frequency-domain symbol-modulated subcarriers for each antenna element. The symbol may be a training symbol having known training values. In operation 506, an angle-of-arrival estimate is generated for the signal source. The angle-of-arrival may be relative to an end-fire direction of the multi-element antenna. The angle-of arrival may be estimated based on the antenna response for the antenna elements for more than one subcarrier frequency of the symbol, although the scope of the invention is not limited in this respect. In operation 508, channel coefficients may be generated from the angle-of-arrival estimate, and in operation 510, the channel coefficients may be used for equalization of symbols, including data symbols, subsequently received from the signal source. In operation 512, beamforming coefficients may be generated based on the angle-of arrival, and in operation 514, a communication signal comprising symbol-modulated subcarriers may be directionally transmitted to the signal source (e.g., in a direction of the signal source) using the beamforming coefficients. In some embodiments, a communication signal comprising symbol-modulated subcarriers may be directionally received from the signal source using the beamforming coefficients.

In some embodiments, the operations of procedure 500 may be repeated or performed concurrently for one or more of a plurality of signal sources. In these embodiments, angles-of-arrival may be individually estimated for the different signal sources, and channel and beamforming coefficients may be generated for the different signal sources and used for communicating with the signal sources. Accordingly, increased channel capacity, improved channel equalization and/or reduced the effects of multipath fading may be achieved, although the scope of the invention is not limited in this respect.

In some embodiments of the present invention, an angle-of-arrival may be estimated by angle-of-arrival estimator 304 (FIG. 2) and channel coefficients may be generated by channel coefficient generator 306 (FIG. 3) as illustrated in the following example. Consider an N-element adaptive antenna receiving J– user signals having J distinct directions $\theta_1, \ldots \theta_J$, where the angles $\theta_j$ are measured with respect to end-fire direction 116 (FIG. 1). In this example, let Q be number of subcarriers used to carry known pilot subsymbols transmission. The remaining (K-Q) subcarriers may be used for information bearing subsymbols. In this example, consider N>Q. For the sake of generality, a single sample case is illustrated which may be further extended for multiple samples in which an average estimate may be obtained. In the single-sample case, the signals may be collected after demodulation by an FFT in the form of matrix, which may be described by the following equations.

$$X = AD + N \quad (1)$$

In equation (1), X is a matrix in which the $i^{th}$ column may correspond to the antenna-array response to the $i^{th}$ subcarrier. D is a diagonal matrix whose elements may correspond to the known pilot symbols scaled by channel coefficients along with the phase shift. A is an array-response matrix for the subcarrier frequencies. m corresponds to the m th symbol. N may be a spatially and temporally uncorrelated noise matrix.

$$X = \begin{bmatrix} x_1(m,0) & x_1(m,1) & \ldots & x_1(m,Q-1) \\ x_2(m,0) & x_2(m,1) & \ldots & x_2(m,Q-1) \\ \ldots & \ldots & \ldots & \ldots \\ x_N(m,0) & x_N(m,1) & \ldots & x_N(m,Q-1) \end{bmatrix} \quad (2)$$

$$A = \begin{bmatrix} 1 & 1 & \ldots & 1 \\ e^{ik_1 d \cos\theta} & e^{ik_2 d \cos\theta} & \ldots & e^{ik_Q d \cos\theta} \\ \ldots & \ldots & \ldots & \ldots \\ e^{ik_1 d(N-1)\cos\theta} & e^{ik_2 d(N-1)\cos\theta} & \ldots & e^{ik_Q d(N-1)\cos\theta} \end{bmatrix} \quad (3)$$

$$D = \mathrm{diag}(p(m,0), p(m,1), \ldots, p(m,Q-1)) \quad (4)$$

$$p(m,0) = s(m,0) h_0 e^{-i\delta_1}, \ldots, p(m,Q-1) = s(m,Q-1) h_{Q-1} e^{-i\delta_{Q-1}} \quad (5)$$

$$N = \begin{bmatrix} n_{11}(m,0) & n_{12}(m,0) & \ldots & n_{1Q}(m,0) \\ n_{21}(m,0) & n_{22}(m,0) & \ldots & n_{2Q}(m,0) \\ \ldots & \ldots & \ldots & \ldots \\ n_{N1}(m,0) & n_{N2}(m,0) & \ldots & n_{NQ}(m,0) \end{bmatrix} \quad (6)$$

In some embodiments, equation (1) may be multiplied by unit vectors, e.g., $e = [1 \ldots 1]^T$ and shown as $Xe = ADe + Ne$ which reduces to:

$$x = Ap \quad (7)$$

where $x = x_1 + x_2 + \ldots + x_{Q-1}$ and $p = p_1 + p_2 + \ldots + p_{Q-1}$ $$x \in \mathrm{span}\{A\} \quad (8)$$

A matrix B may be formed.

$$B = [A(\theta)x] \text{ where } \theta \in (0, 2\pi). \quad (9)$$

The size of matrix B may be N(Q+1), where N≧(Q+1).

Matrix B may become rank deficient (e.g., undetermined) when $\theta = \theta_{true}$. The $\theta_{true}$ estimate can be found from the following QR-decomposition and search function.

$$B(\theta) = Q(\theta) R(\theta), \quad (10)$$

with search function as $$G(\theta) = \max\left[\frac{1}{r_{(Q)(Q)}(\theta)}\right]. \quad (11)$$

$r_{Q,Q}(\theta)$ is the Q-th diagonal element of the upper triangular matrix $R(\theta)$. The search function $G(\theta)$ may have J-highest peaks that may correspond to the angle-of-arrival estimates, $\hat{\theta}_1, \ldots \hat{\theta}_J$ of J-sources. Note that the estimates $(\hat{\theta}_1, \ldots \hat{\theta}_J)$ may be obtained from processing of four pilot subcarriers that are spaced quite apart in the frequency spectrum. Such a property may provide a good approximation of the angle-of-arrival corresponding to the complete set of subcarriers in the OFDM. In other words the estimates may correspond to angle-of arrival of broadband signal sources.

Having obtained $\hat{\theta} \in (\hat{\theta}_1, \ldots \hat{\theta}_J)$, $\hat{\theta}$ may be substituted in the matrix A in equation (7) as $$\hat{x} = A(\hat{\theta}) p. \quad (12)$$

Thus, in equation (12) p remains unknown, and may be obtained as follows:

$$p = [A(\hat{\theta}) A(\hat{\theta})]^{-1} A^T(\hat{\theta}) x. \quad (13)$$

The k th element of p is $p(m,k)=s(m,k)h_k e^{-i\delta_k}$. Since $s(m,k)$ is known, the channel estimation may be obtained as $$h_k e^{-i\delta_k} = \frac{p(m,k)}{s(m,k)} \quad (14)$$

where $s(m,k)$, $k=1, \ldots, Q$ are known pilot symbols.

In the second stage, the next set of Q-subcarriers may be chosen to obtain the channel coefficients as, $$p=[A(\hat{\theta})A(\hat{\theta})]^{-1}A^T(\hat{\theta})x,$$

where $A(\hat{\theta})$ corresponds to the columns as a function of next subset of subcarriers. This channel estimation process may be repeated for this next subset of subcarriers.

In some embodiments, the estimation of angular information $\hat{\theta}$ of a signal source may be performed for only one sample. The angular estimate $\hat{\theta}$ may be repeatedly used for each subset of subcarrier matrices and accordingly the channel estimates for entire subcarrier channels may be found. For increased reliability, in some embodiments, the angular estimation may be performed for each sample and the average estimate can be obtained as follows:

$$\theta_{estimate}=E[\hat{\theta}]. \quad (15)$$

In some embodiments, beamforming in the direction $\theta_{estimate}$ is performed to increase the channel capacity. With beamforming, frequency reuse may be realized using space-division multiple access techniques. The beamforming may be used for both reception and transmission.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A multicarrier transceiver for communicating orthogonal frequency division multiplexed (OFDM) signals in a wireless multiple access network over a plurality of space-division multiple access (SDMA) communication channels with a multi-element array antenna, the transceiver comprising:
   a beamformer coefficient generator to generate beamforming coefficients based on channel characteristics; and
   a beamformer to apply the beamforming coefficients to groups of one or more subcarriers of a set of a plurality of subcarriers that comprise the OFDM signals to control phasing between elements of the multi-element array antenna for communicating through two or more SDMA communication channels, each of the two or more SDMA communication channels to concurrently convey separate data streams over the set of subcarriers.

2. The multicarrier transceiver of claim 1 further comprising RF circuitry coupled to the multi-element array antenna to generate RF signals for transmission from baseband signals provided by the beamformer, the RF signals being directed toward one or more signals sources.

3. A method for communicating orthogonal frequency division multiplexed (OFDM) signals in a wireless multiple access network over a plurality of space-division multiple access (SDMA) communication channels with a multi-element array antenna, the method comprising:
   generating beamforming coefficients based on received training signals; and
   applying the beamforming coefficients to groups of one or more subcarriers of a set of a plurality of subcarriers that comprise the OFDM signals to control phasing between elements of the multi-element array antenna for communicating through two or more SDMA communication channels, each of the two or more SDMA communication channels to concurrently convey separate data streams over the set of subcarriers.

4. The method of claim 3 further comprising:
   generating RF signals for transmission by the multi-element array antenna from baseband signals provided by the beamformer; and
   directing the RF signals toward one or more signals sources.

5. A method for beamforming in a wireless access network that communicates using orthogonal frequency division multiplexed (OFDM) communication signals over a plurality of space-division multiple access (SDMA) channels, the method comprising:
   receiving OFDM training symbols over the spatial channels through a plurality of associated antennas, each of the associated antennas comprising elements of a multi-element array antenna;
   generating channel estimates for the spatial channels based on receipt of the training symbols; and
   generating beamforming coefficients based on the channel estimates and applying the beamforming coefficients to groups of one or more subcarriers of a set of a plurality of individual subcarriers that comprise OFDM signals for subsequent communications,
   wherein the beamforming coefficients are applied at baseband to control phasing between elements of the multi-element array antenna, and
   wherein the associated antennas that comprise elements of the multi-element array antenna are configured for communicating through two or more SDMA communication channels, each of the two or more SDMA communication channels to concurrently convey separate data streams over the set of subcarriers.

6. The method of claim 5 further comprising:
   generating the beamforming coefficients for the groups of subcarriers based on received training signals; and
   transmitting RF signals toward one or more signals sources.

* * * * *